US012454109B2

(12) United States Patent
Plyler

(10) Patent No.: US 12,454,109 B2
(45) Date of Patent: Oct. 28, 2025

(54) CHALCOGENIDE LENS ELEMENTS AND METHODS OF MANUFACTURE

(71) Applicant: FLIR Systems Trading Belgium BVBA, Meer (BE)

(72) Inventor: Jennifer L. Plyler, Charlotte, NC (US)

(73) Assignee: FLIR Systems Trading Belgium BVBA, Meer (BE)

(*) Notice: Subject to any disclaimer, the term of this patent is extended or adjusted under 35 U.S.C. 154(b) by 632 days.

(21) Appl. No.: 17/641,085

(22) PCT Filed: Sep. 8, 2020

(86) PCT No.: PCT/US2020/049768
§ 371 (c)(1),
(2) Date: Mar. 7, 2022

(87) PCT Pub. No.: WO2021/050444
PCT Pub. Date: Mar. 18, 2021

(65) Prior Publication Data
US 2022/0281194 A1 Sep. 8, 2022

Related U.S. Application Data

(60) Provisional application No. 62/897,497, filed on Sep. 9, 2019.

(51) Int. Cl.
*B29D 11/00* (2006.01)
*G02B 13/14* (2006.01)

(52) U.S. Cl.
CPC .. *B29D 11/00307* (2013.01); *B29D 11/00403* (2013.01); *G02B 13/14* (2013.01)

(58) Field of Classification Search
CPC ........ B29D 11/00307; B29D 11/00403; G02B 13/14; G02B 1/02; G02B 3/00;
(Continued)

(56) References Cited

U.S. PATENT DOCUMENTS 6,749,905 B1 * 6/2004 Breitung .................. G02B 6/13
427/255.18
8,303,866 B2 11/2012 Delaney et al.
(Continued)

FOREIGN PATENT DOCUMENTS

JP         2006220705 A  *  8/2006
WO    WO 2009/120346 A1    10/2009
WO    WO-2018232185 A1 * 12/2018 ....... B29D 11/00432

OTHER PUBLICATIONS

Machine translation of JP 2006220705 A (Year: 2006).*
(Continued)

*Primary Examiner* — William R Alexander
*Assistant Examiner* — Matthew Y Lee
(74) *Attorney, Agent, or Firm* — Haynes and Boone, LLP

(57) ABSTRACT

Chalcogenide lens elements and methods of manufacturing such lens elements are provided. In one example, a method includes depositing a first chalcogenide layer on a substrate. The method further includes applying a first stamp to the first chalcogenide layer. The method further includes reflowing, in response to applying the first stamp, the first chalcogenide layer to form a first shaped chalcogenide layer. The method may further include singulating the substrate and the first shaped chalcogenide layer to obtain a plurality of chalcogenide lens elements.

20 Claims, 16 Drawing Sheets

(58) Field of Classification Search
CPC ...... G02B 3/0018; G02B 3/0031; G02B 1/00;
G02B 13/18; G02B 13/146; G02B 5/208;
G02B 13/008; G02B 6/102; G02B 1/11;
C03B 23/02; C03B 2201/86; C03C 4/10
See application file for complete search history.

(56) References Cited

U.S. PATENT DOCUMENTS

| | | | |
|---|---|---|---|
| 8,611,026 | B2 | 12/2013 | Han et al. |
| 2007/0207325 | A1* | 9/2007 | Brinley ............ C03C 17/256 427/430.1 |
| 2010/0315724 | A1* | 12/2010 | Fukuta ............ G02B 13/0035 359/716 |
| 2013/0308212 | A1* | 11/2013 | Kubala ............ G02B 7/021 359/819 |
| 2017/0057856 | A1* | 3/2017 | Ashida ............ C03B 11/122 |
| 2017/0315271 | A1* | 11/2017 | Kahara ............ G02B 13/14 |
| 2018/0321457 | A1* | 11/2018 | Symmons ............ B29D 11/00 |
| 2022/0244635 | A1* | 8/2022 | Schvartzman ........ C03C 23/007 |

OTHER PUBLICATIONS

Sanchez, Eric A. et al., "Chalcogenide Glass Microlenses by Inkjet Printing", May 4, 2011, pp. 1974-1978, Applied Optics, vol. 50—No. 14, Optical Society of America, USA.
Orava, Jiri et al., "Soft Imprint Lithography of a Bulk Chalcogenide Glass", Aug. 3, 2011, pp. 796-802, Optical Materials Express 796, vol. 1—No. 5, Optical Society of America, USA.
Madden, Steve et al., "Low Loss Chalcogenide Glass Waveguides Fabricated by Thermal Nanoimprint Lithography", 2010, 3 pages, Optical Society of America, USA.
Zou, Yi et al., "Thermal Nanoimprint Fabrication of Chalcogenide Glass Waveguide Resonators on Nonconventional Plastic Substrates", 2013, pp. 66-67, Optical Society of America, USA.
Franks, John et al., "Molded, wafer level optics for long wave infra-red applications", Advanced Optics for Defense Applications: UV through LWIR, Proceedings of SPIE, May 16, 2016, pp. 98220B-98220B, vol. 9822, SPIE, USA.
Dixit, Awakash et al., "Design, Fabrication and Characterization of Solution-based Molded Chalcogenide Optics for Infrared Application," Sep. 27, 2016, pp. 1-7, vol. 9949, Kanpur/India.

* cited by examiner

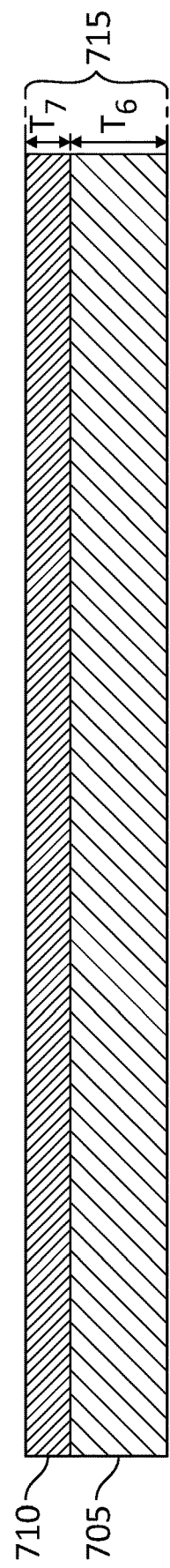
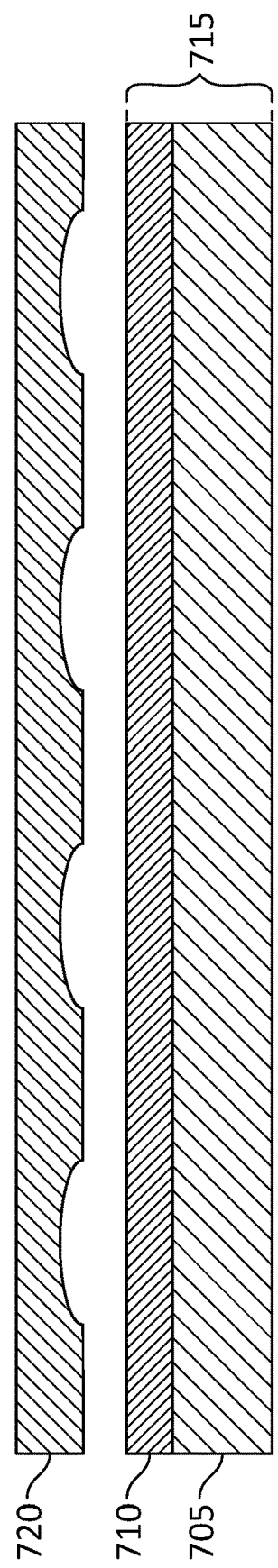
FIG. 7A
FIG. 7B

CHALCOGENIDE LENS ELEMENTS AND METHODS OF MANUFACTURE

CROSS-REFERENCE TO RELATED APPLICATIONS

This patent application is a U.S. National Stage Patent Application under 35 U.S.C. 371 of International Patent Application No. PCT/US2020/049768 filed Sep. 8, 2020 and entitled "CHALCOGENIDE LENS ELEMENTS AND METHODS OF MANUFACTURE," which claims priority to and the benefit of U.S. Provisional Patent Application No. 62/897,497 filed Sep. 9, 2019 and entitled "CHALCOGENIDE LENS ELEMENTS AND METHODS OF MANUFACTURE," which are hereby incorporated by reference in their entirety.

TECHNICAL FIELD

One or more embodiments relate generally to optical components for thermal imaging and more particularly, for example, to chalcogenide lens elements and methods of manufacture.

BACKGROUND

Lenses may be utilized to facilitate imaging applications. For example, in the field of thermal imaging, lenses may be formed using standard molding techniques and may be used to allow for imaging in a wide infrared spectrum. In some cases, to facilitate low cost in fabricating lenses, a lens assembly including an array of lenses would be desirable, with individual lenses then obtained by singulating the lens assembly.

SUMMARY

In one or more embodiments, a method includes depositing a first chalcogenide layer on a substrate. The method further includes applying a first stamp to the first chalcogenide layer. The method further includes reflowing, in response to applying the first stamp, the first chalcogenide layer to form a first shaped chalcogenide layer. The method may further include singulating the substrate and the first shaped chalcogenide layer to obtain a plurality of chalcogenide lens elements.

In one or more embodiments, a chalcogenide lens element includes a substrate including a first portion of a wafer-level lens array. The chalcogenide lens element further includes a first chalcogenide layer including a second portion of the wafer-level lens array, where the first chalcogenide layer is on the substrate.

In one or more embodiments, an infrared imaging device that includes the chalcogenide lens element and a method of assembling the infrared imaging device are also provided. The infrared imaging device further includes a housing. The infrared imaging device further includes a lens barrel including the chalcogenide lens element, where the lens barrel is coupled to the housing. The infrared imaging device further includes an image capture component within the housing and configured to receive electromagnetic radiation passed through the chalcogenide lens element and generate image data based on the received electromagnetic radiation.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 7A through 7G illustrate cross-sectional views of chalcogenide lens elements being formed on a substrate material, in accordance with one or more embodiments.

Figure 1:
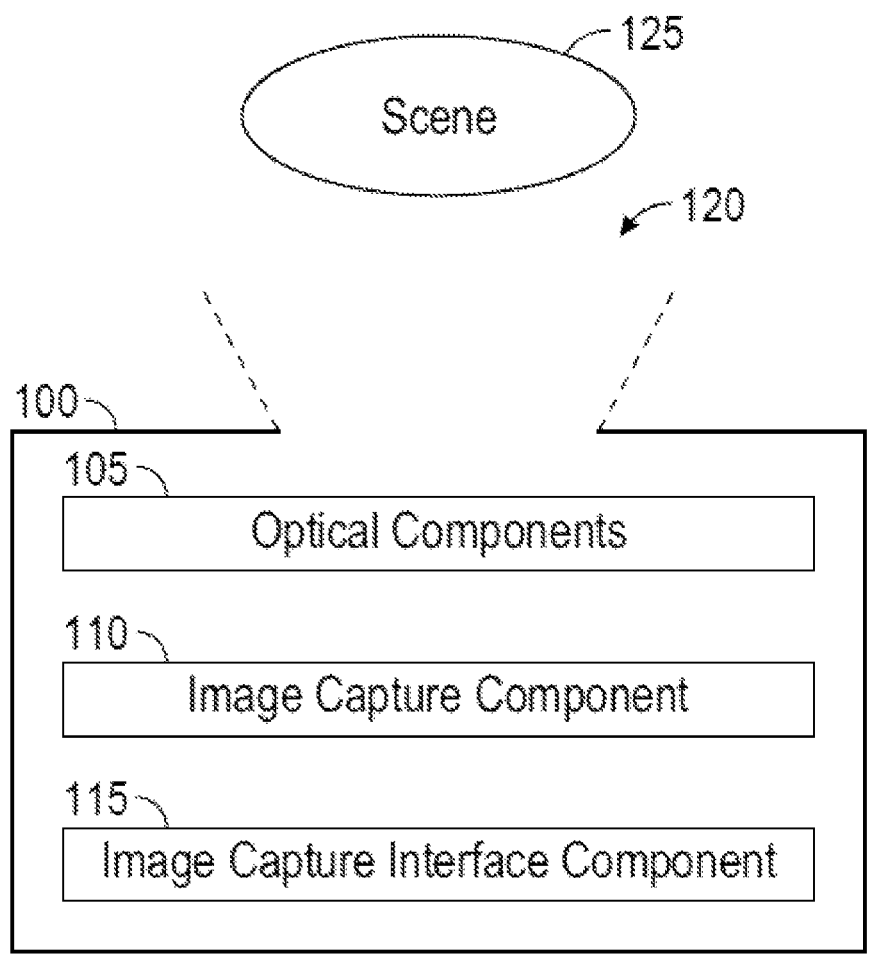
FIG. 1 illustrates a block diagram of an infrared imaging device in accordance with one or more embodiments of the disclosure.

Embodiments of the present disclosure and their advantages are best understood by referring to the detailed description that follows. It is noted that sizes of various components and distances between these components may not be drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

In one or more embodiments, chalcogenide lens elements and methods of manufacture are provided. In some aspects, such chalcogenide lens elements may be utilized as infrared imaging lens elements. The chalcogenide lens elements may include one or more shaped chalcogenide layers provided on one or more surfaces of a substrate (e.g., silicon, germanium). In some cases, each shaped chalcogenide layer may be in direct contact with a surface of the substrate (e.g., without any intervening layers between the shaped chalcogenide layer and the substrate). For example, a chalcogenide lens element may include a shaped chalcogenide layer on a top surface and/or a bottom surface of a substrate. In other cases, one or more intervening layers may be between the substrate and a shaped chalcogenide layer. In some cases, the shaped chalcogenide layers may have aspheric shapes (e.g., conical or complex aspherical). In other cases, the shaped chalcogenide layers may have spherical shapes or anamorphic shapes.

In some embodiments, a chalcogenide lens element (e.g., also referred to as a chalcogenide lens) may be formed by imprinting (e.g., thermally imprinting) a layer of chalcogenide material that has been deposited onto a substrate. In cases where multiple layers of chalcogenide materials have been deposited onto the substrate (e.g., on opposite surfaces of the substrate), separate imprinting processes may be performed on each layer of chalcogenide material. For a given layer of chalcogenide material, such imprinting may be performed by applying a stamp to the layer of chalcogenide material. Heat and/or pressure may be applied to the layer of chalcogenide material to cause reflow of the chalcogenide material to form a shaped chalcogenide layer. By way of a non-limiting example, the chalcogenide lens element may be plano-convex, plano-concave, biconcave, biconvex, or concave-convex. The chalcogenide lens element may be with or without a diffractive element. The stamp may be made of a material having elasticity and sufficient mechanical strength, such as polydimenthylsiloxane (PDMS), polytetrafluoroethylene (PTFE), or other material. In another example, the stamp may be made of a rigid material, such as a metal alloy (e.g., nickel alloy), silicon, ceramic, or other material.

Conventional approaches to creating lenses, such as microlenses, may involve depositing a sacrificial layer of polymer on a wafer and etching the sacrificial layer. Etch times may be long and/or etch equipment may be costly. In many such conventional approaches, the etch equipment may be a bottleneck in creating the lenses, expensive to purchase and maintain, and create variation across a wafer which may cause yield loss in a lens assembly due to form error. Further in this regard, conventional molding techniques may be utilized by lens manufacturers to create lenses alternatively or in addition to etching. Such techniques do not allow for the economies of scale compared to wafer-level optics. In addition, these techniques do not achieve small sizes and shapes associated with leveraging wafer-level optics. In this regard, conventional molding techniques generally require each lens to be handled individually, with a volume of the starting material being the same as a volume of the final resulting lens. As size is reduced, the material becomes increasingly more difficult to handle. As an example, a volume of commercially available molded infrared lens may be around 10 mm$^3$ or larger. Wafer level optics are suitable for lower lens volumes, such as volumes of 1 mm$^3$ or smaller.

In contrast, using various embodiments as described herein, a thin layer of chalcogenide glass may be replicated on a substrate rather than replicated on a polymer on a substrate. By not utilizing a polymer, associated etch equipment may also be eliminated, thus eliminating a source of variation and reducing overhead costs. As such, embodiments described herein may provide flexibility in design rules for lens shapes compared to conventional approaches that need to take into account etch rate differences between the substrate (e.g., silicon) and the polymer. Furthermore, embodiments described herein allow achieving of small sizes and shapes associated with wafer-level optics.

FIG. 1 illustrates a block diagram of an infrared imaging device 100 in accordance with one or more embodiments of the disclosure. The infrared imaging device 100 may be used to capture and process image frames. The infrared imaging device 100 includes optical components 105, an image capture component 110, and an image capture interface component 115.

The optical components 105 may receive electromagnetic radiation through an aperture 120 of the infrared imaging device 100 and pass the electromagnetic radiation to the image capture component 110. For example, the optical components 105 may direct and/or focus electromagnetic radiation on the image capture component 110. The optical components 105 may include one or more windows, lenses, mirrors, beamsplitters, beam couplers, and/or other components. In an embodiment, the optical components 105 may include one or more chalcogenide lenses, such as lenses made of $As_{40}Se_{60}$, that allow for imaging in a wide infrared spectrum.

The image capture component 110 includes, in one embodiment, one or more sensors (e.g., visible-light sensor, infrared sensor, or other type of detector) for capturing image signals representative of an image of a scene 125. The image capture component 110 may capture (e.g., detect, sense) infrared radiation with wavelengths in the range from around 700 nm to around 1 mm, or portion thereof. For example, in some aspects, the image capture component 110 may include one or more sensors sensitive to (e.g., better detect) thermal infrared wavelengths, including mid-wave infrared (MWIR) radiation (e.g., electromagnetic radiation with wavelength of 2-5 µm) and/or long-wave infrared (LWIR) radiation (e.g., electromagnetic radiation with wavelength of 7-14 µm). In one embodiment, the sensor(s) of the image capture component 110 may represent (e.g., convert) or facilitate representation of a captured thermal image signal of the scene 125 as digital data (e.g., via an analog-to-digital converter).

The image capture interface component 115 may receive image data captured at the image capture component 110 and may communicate the captured image data to other components or devices, such as via wired and/or wireless communication. In various embodiments, the infrared imaging device 100 may capture image frames, for example, of the scene 125.

In some embodiments, the optical components 105, image capture component 110, and image capture interface component 115 may be housed in a protective enclosure (e.g., also referred to as a housing). In an aspect, the protective enclosure may be represented by the solid-line box in FIG. 1 having the aperture 120. For example, the aperture 120 may be an opening defined in the protective enclosure that allows electromagnetic radiation to reach the optical components 105.

The infrared imaging device 100 may represent any type of camera system which, for example, detects electromagnetic radiation (e.g., thermal radiation) and provides representative data (e.g., one or more still image frames or video image frames). For example, the infrared imaging device 100 may be configured to detect visible light and/or infrared radiation and provide associated image data.

Figure 2A:
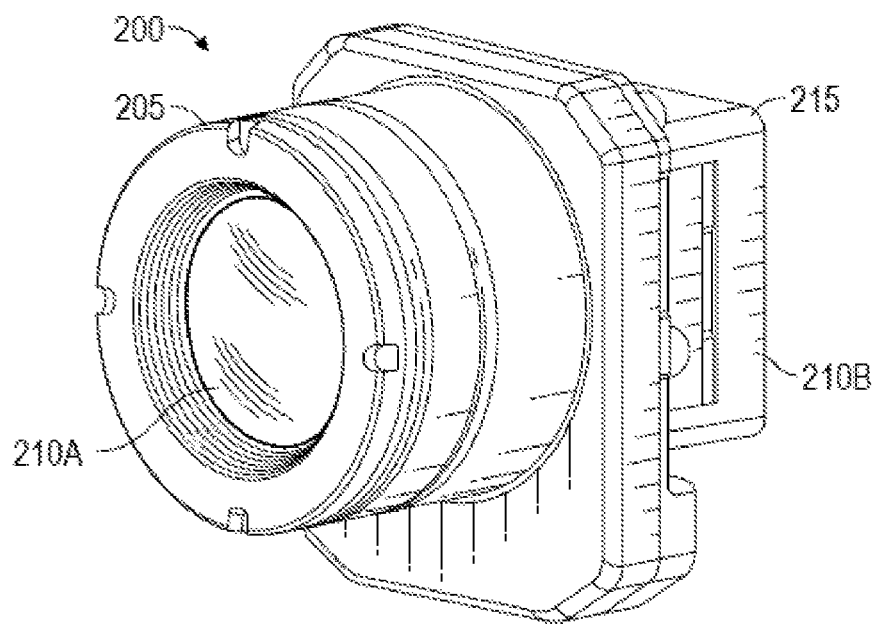
FIG. 2A illustrates a perspective view of an infrared imaging device in accordance with one or more embodiments of the disclosure.

FIG. 2A illustrates a perspective view of an infrared imaging device 200 in accordance with one or more embodiments of the disclosure. As one example, the infrared imaging device 200 may be an LWIR thermal camera (e.g., for capturing electromagnetic radiation with wavelengths of 7-14 µm). In other cases, the infrared imaging device 200 may be utilized to capture electromagnetic radiation within other wavelength ranges. The infrared imaging device 200 may have a compact size of approximately 11 mm×11 mm×6 mm and may weigh approximately 7.5 grams. The infrared imaging device 200 may have an operating temperature range of −40° C. to 85° C.

The infrared imaging device 200 may include a lens barrel 205 configured to accommodate lens elements 210A and 210B. The infrared imaging device 200 also may include an image capture portion 215 including an image capture component configured to capture images viewed through the lens barrel 205. The image capture portion 215 may include arrays of microbolometers configured to detect electromagnetic radiation. As one example, the arrays of microbolometers may be configured to detect long-wave infrared light of wavelengths between 7.5 µm and 13.5 µm. In an embodiment, the infrared imaging device 200 may be the infrared imaging device 100 of FIG. 1. In this embodiment, the optical components 105 of FIG. 1 may include the lens elements 210A and 210B, and the image capture component 110 of FIG. 1 may include the image capture portion 215.

Figure 2B:
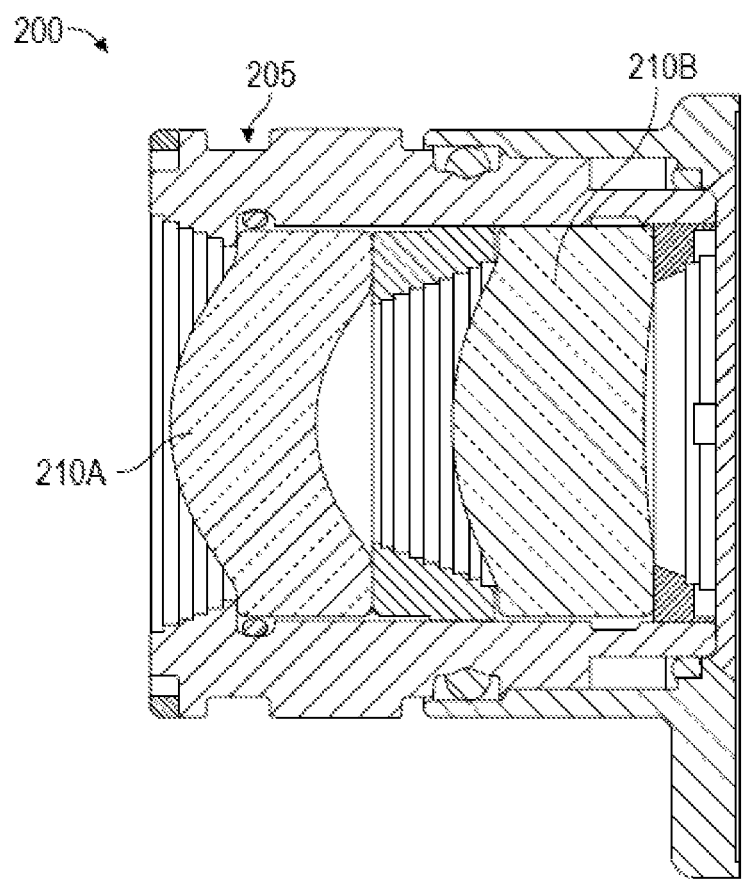
FIGS. 2B and 2C illustrate cross-sectional views of the infrared imaging device of FIG. 2A in accordance with one or more embodiments of the disclosure.

FIG. 2B illustrates a cross-sectional view of the infrared imaging device 200 of FIG. 2A in accordance with one or more embodiments of the disclosure. As shown in FIG. 2B, the lens elements 210A and 210B are lenses accommodated in the lens barrel 205. One or both of the lens elements 210A and 210B may be molded chalcogenide lenses configured to transmit a wide spectrum of infrared light. Each of the lens elements 210A and 210B (e.g., and other optical components not labeled or shown in FIGS. 2A and 2B) may have specific optical characteristics, such as a specific effective focal length (EFL) and modulation transfer function (MTF). The lens elements 210A and 210B may coordinate to direct and focus infrared light onto the image capture portion 215.

Figure 2C:
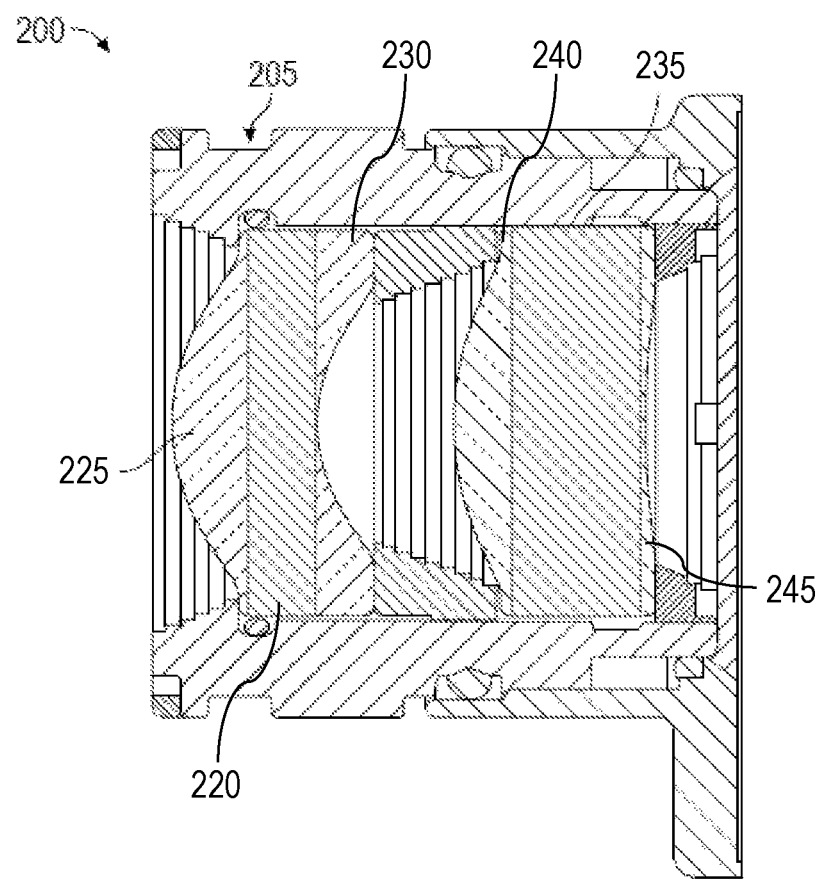

In one or more embodiments, the optical components 105 of FIG. 1 may include one or more lens elements. For example, the optical components 105 may include the lens elements 210A and 210B. In some aspects, a lens element may include a substrate and at least one lens shape imprinted in a thin film of chalcogenide glass deposited on the substrate. In an embodiment, the lens shape may be an aspheric lens shape (e.g., also referred to as aspherical lens shape). For example, the substrate may be silicon substrate or germanium substrate. The lens element may be plano-convex, plano-concave, biconcave, biconvex, or concave-convex. The lens element may be with or without a diffractive element. As an example, in FIG. 2C, the lens element 210A includes a substrate 220, a shaped chalcogenide layer 225 on a first surface of the substrate 220, and a shaped chalcogenide layer 230 on a second surface of the substrate 220 opposite the first surface. The lens element 210B includes a substrate 235, a shaped chalcogenide layer 240 on a first surface of the substrate 235, and a shaped chalcogenide layer 245 on a second surface of the substrate 235 opposite the first surface. The substrates 220 and/or 235 may include silicon substrate or germanium substrate.

Figure 3A:
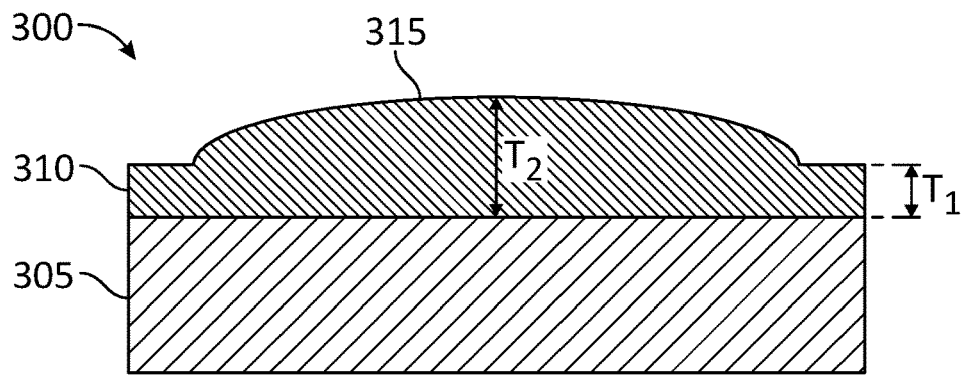
FIGS. 3A through 3E illustrate examples of lens elements in accordance with one or more embodiments of the disclosure.

FIGS. 3A through 3E illustrate examples of lens elements in accordance with one or more embodiments of the disclosure. FIG. 3A illustrates a lens element 300 in accordance with one or more embodiments of the disclosure. The lens element 300 includes a substrate 305 (e.g., silicon substrate, germanium substrate) and a shaped chalcogenide layer 310 on a surface of the substrate 305. The shaped chalcogenide layer 310 has a curved portion 315 that forms a convex surface extending away from the substrate 305. In this regard, the curved portion 315 may be referred to as extending away from the substrate 305 in a convex manner. As a non-limiting example, a thickness $T_1$ of the shaped chalcogenide layer 310 may be approximately between 0.0005 mm and 0.30 mm, and a thickness $T_2$ of the shaped chalcogenide layer 310 (e.g., a thickest portion of the shaped chalcogenide layer 310) may be approximately between 0.002 mm and 0.40 mm.

Figure 3B:
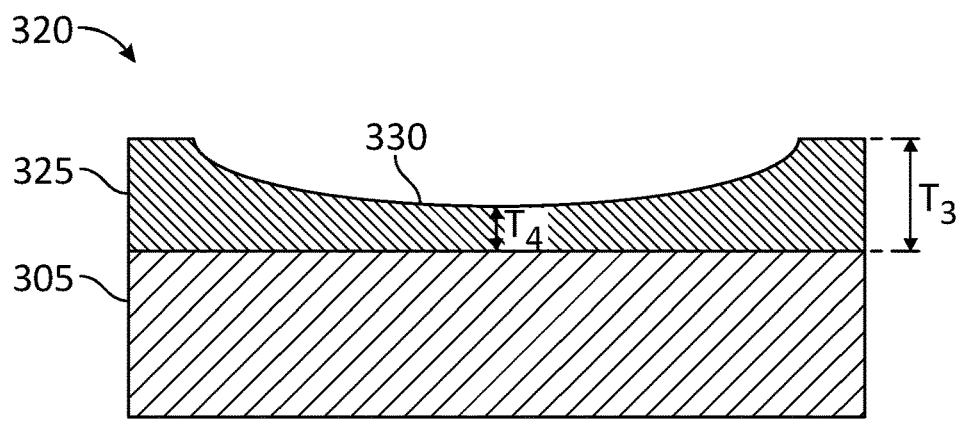

FIG. 3B illustrates a lens element 320 in accordance with one or more embodiments of the disclosure. The lens element 320 includes the substrate 305 (e.g., silicon substrate, germanium substrate) and a shaped chalcogenide layer 325 on a surface of the substrate 305. The shaped chalcogenide layer 325 has a curved portion 330 that forms a concave surface extending inwards toward the substrate 305. In this regard, the curved portion 330 may be referred to as extending toward the substrate 305 in a convex manner. As a non-limiting example, a thickness $T_3$ of the shaped chalcogenide layer 325 may be approximately between 0.002 mm and 0.40 mm, and a thickness $T_4$ of the shaped chalcogenide layer 325 (e.g., a thinnest portion of the shaped chalcogenide layer 415) may be approximately between 0.0005 mm and 0.30 mm.

Figure 3C:
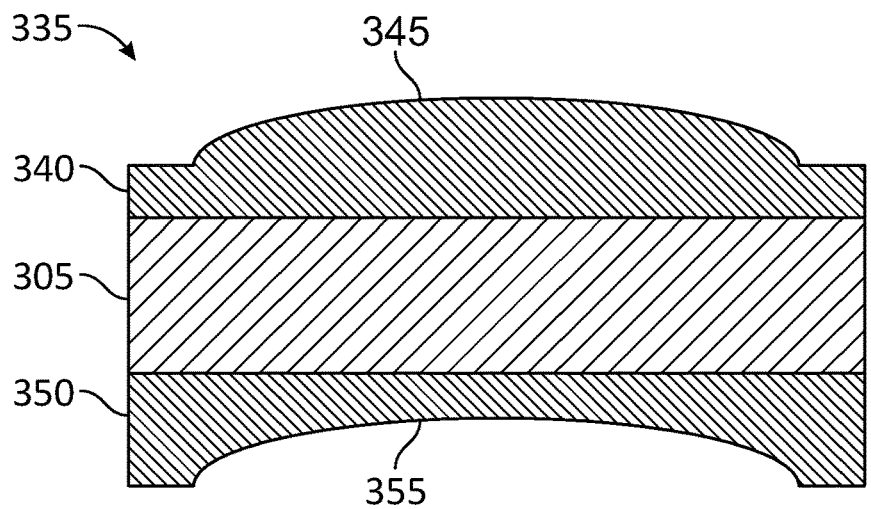

FIG. 3C illustrates a lens element 335 in accordance with one or more embodiments of the disclosure. The lens element 335 includes the substrate 305 and shaped chalcogenide layers 340 and 350. The shaped chalcogenide layer 340 is on a first surface (e.g., top surface) of the substrate 305 and the shaped chalcogenide layer 350 is on a second surface (e.g., bottom surface) of the substrate 305, where the first surface is opposite the second surface. The shaped chalcogenide layer 340 has a curved portion 345 that forms a convex surface extending away from the substrate 305 (e.g., extending away from the first surface of the substrate 305). The shaped chalcogenide layer 350 has a curved portion 355 that forms a concave surface extending inwards toward the substrate 305 (e.g., extending inwards toward the second surface of the substrate 305). In an aspect, as a non-limiting example, the shaped chalcogenide layer 340 may have thicknesses similar to the thicknesses $T_1$ and $T_2$ of the shaped chalcogenide layer 310, and/or the shaped chalcogenide layer 350 may have thicknesses similar to the thicknesses $T_3$ and $T_4$ of the shaped chalcogenide layer 325.

Figure 3D:
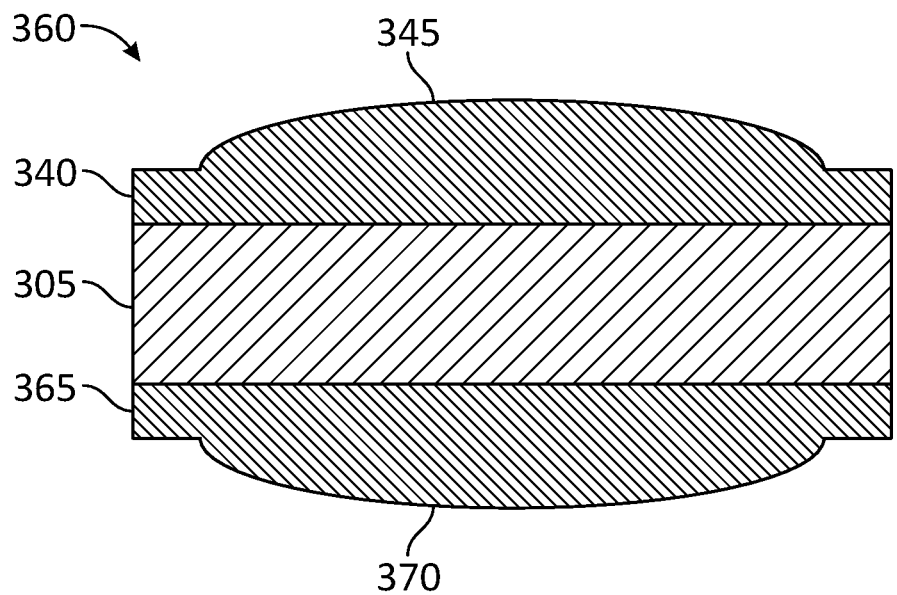

FIG. 3D illustrates a lens element 360 in accordance with one or more embodiments of the disclosure. The lens element 360 includes the substrate 305, the shaped chalcogenide layer 340 on the first surface of the substrate 305, and a shaped chalcogenide layer 365 on the second surface of the substrate 305. Similar to the shaped chalcogenide layer 340, the shaped chalcogenide layer 365 has a curved portion 370 that forms a convex surface extending away from the substrate 305 (e.g., extending away from the second surface of the substrate 305). In an aspect, as a non-limiting example, the shaped chalcogenide layers 340 and/or 365 may have thicknesses similar to the thicknesses $T_1$ and $T_2$ of the shaped chalcogenide layer 310.

Figure 3E:
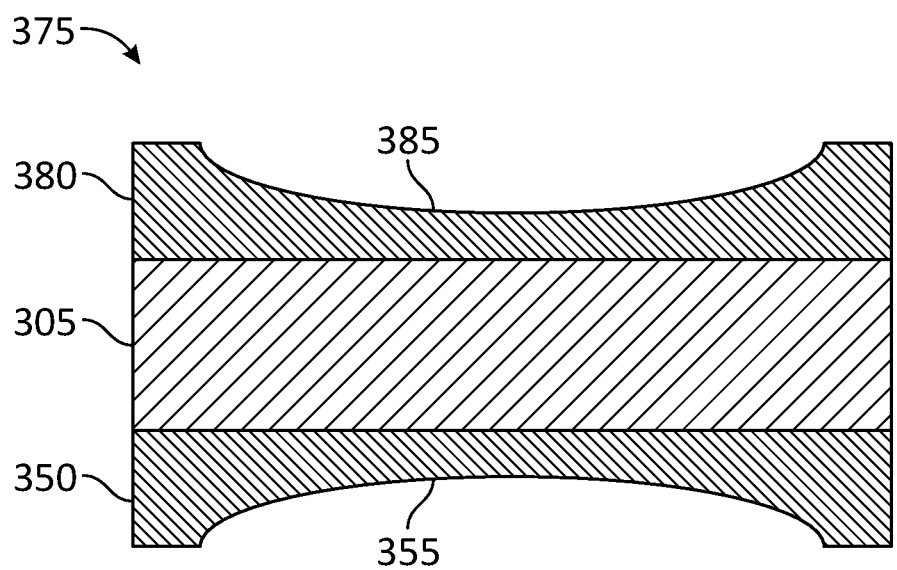

FIG. 3E illustrates a lens element 375 in accordance with one or more embodiments of the disclosure. The lens element 375 includes the substrate 305, a shaped chalcogenide layer 380 on the first surface of the substrate 305, and the shaped chalcogenide layer 350 on the second surface of the substrate 305. Similar to the shaped chalcogenide layer 350, the shaped chalcogenide layer 375 has a curved portion 385 that forms a concave surface extending inwards toward the substrate 305 (e.g., extending inwards toward the first surface of the substrate 305). In an aspect, as a non-limiting example, the shaped chalcogenide layers 350 and/or 375 may have thicknesses similar to the thicknesses $T_3$ and $T_4$ of the shaped chalcogenide layer 325.

Figure 4A:
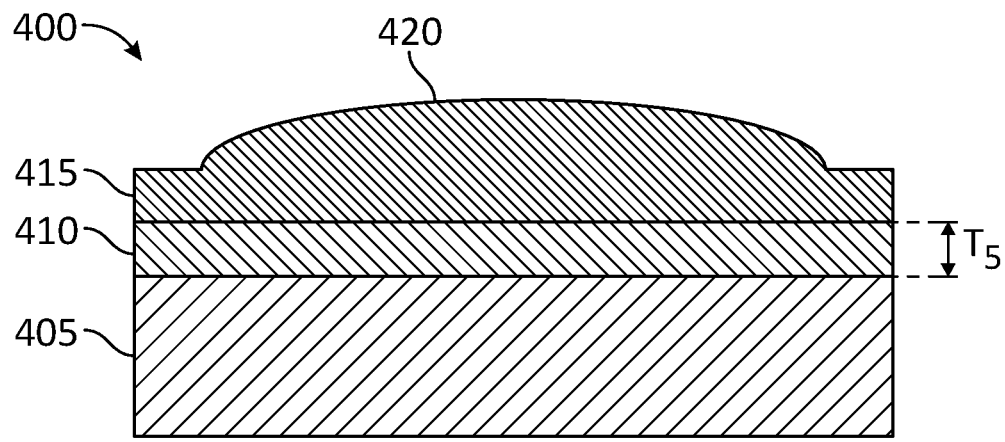
FIGS. 4A and 4B illustrate additional examples of lens elements in accordance with one or more embodiments of the disclosure.
Figure 4B:
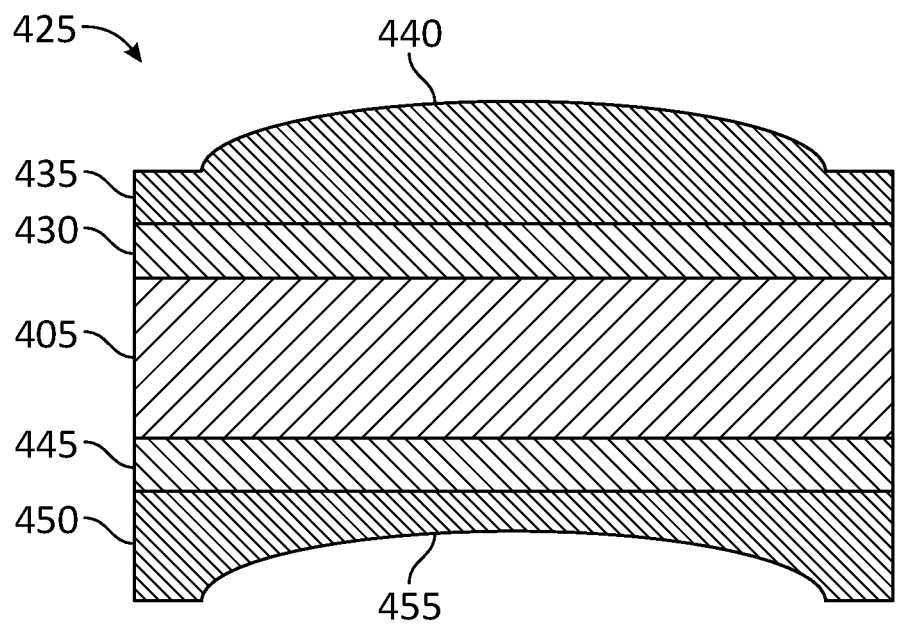
Figure 5A:
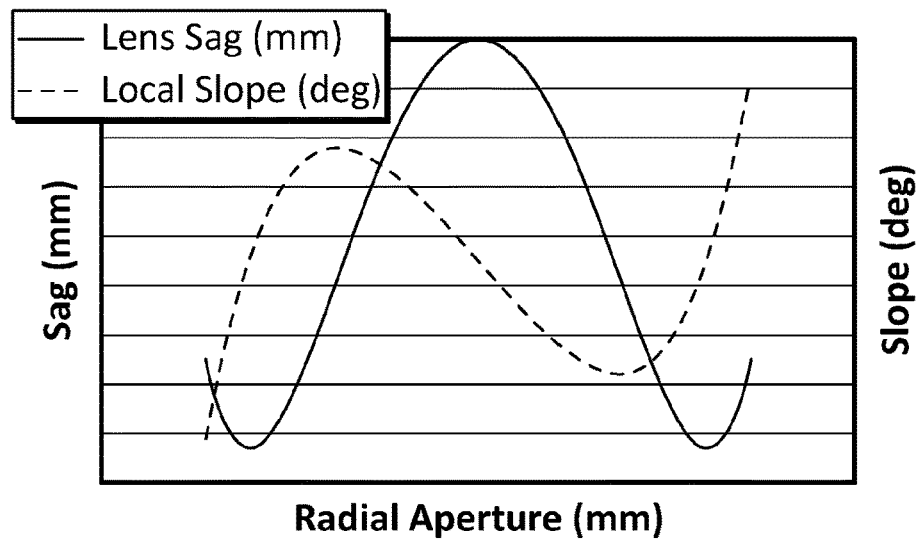
FIGS. 5A through 5E illustrate examples of lens shapes in accordance with one or more embodiments of the disclosure.
Figure 5B:
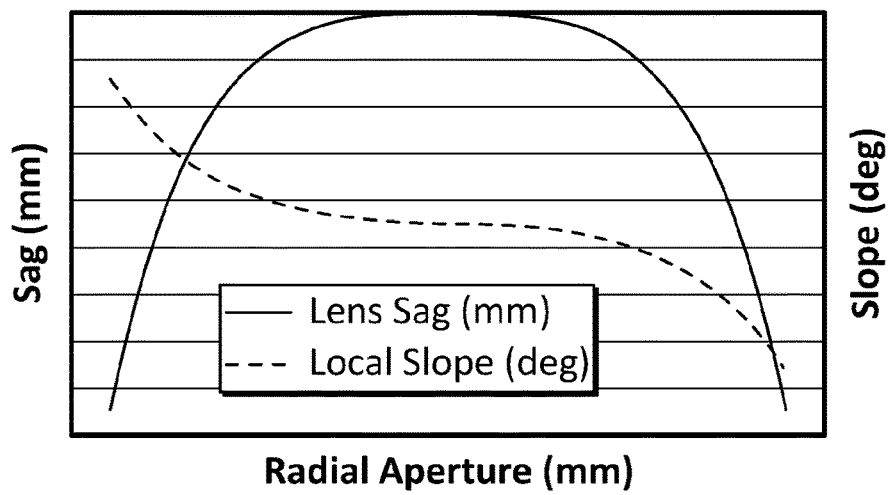
Figure 5C:
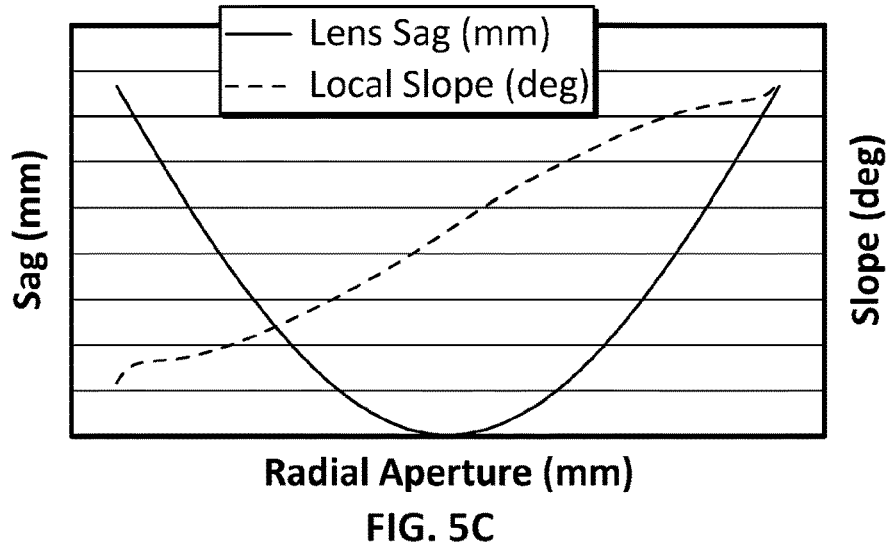
Figure 5D:
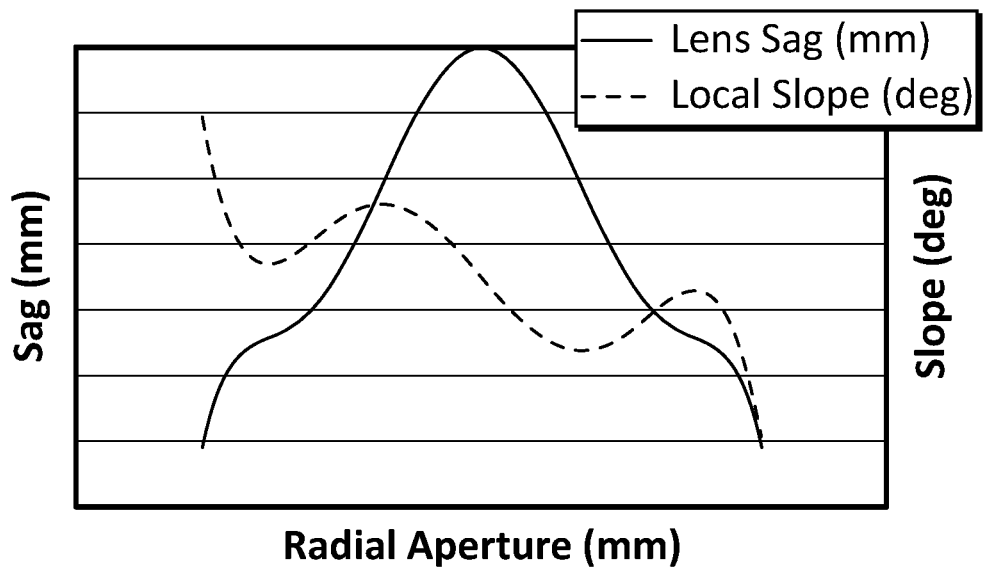
Figure 5E:
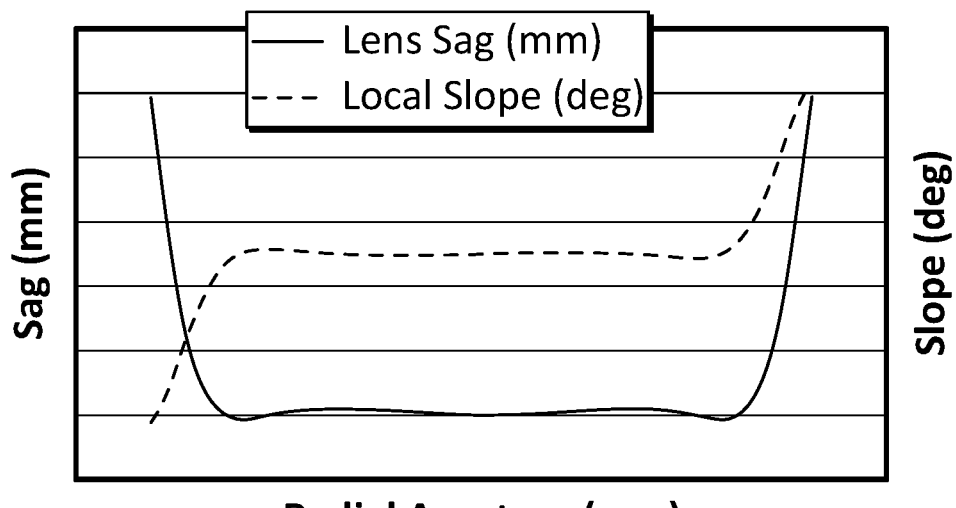

FIGS. 4A and 4B illustrate examples of lens elements in accordance with one or more embodiments of the disclosure. FIG. 4A illustrates a lens element 400 in accordance with one or more embodiments of the disclosure. The lens element 400 includes a substrate 405 (e.g., silicon substrate, germanium substrate), a layer 410 on a surface of the substrate 405, and a shaped chalcogenide layer 415 on a surface of the layer 410. In some cases, the layer 410 is disposed on and in contact with the substrate 405, and the shaped chalcogenide layer 415 is disposed on and in contact with the layer 410. The layer 410 may be, or may include, an anti-reflective coating, adhesion promoter, aperture, and/or other layer of material dependent on application. The layer 410 may be referred to as a supplementary layer. As a non-limiting example, a thickness $T_5$ of the layer 410 may be approximately between 0.001 μm and 15 μm. The shaped chalcogenide layer 415 has a curved portion 420 that forms a convex surface extending away from the substrate 405. In an aspect, as a non-limiting example, the shaped chalcogenide layer 415 may have thicknesses similar to the thicknesses $T_1$ and $T_2$ of the shaped chalcogenide layer 310.

FIG. 4B illustrates a lens element 425 in accordance with one or more embodiments of the disclosure. The lens element 425 includes the substrate 405, a layer 430 on a first surface of the substrate 405, a shaped chalcogenide layer 435 on the layer 430, a layer 445 on a second surface of the substrate 405 that is opposite of the first surface, and a shaped chalcogenide layer 450 on the layer 445. The layers 430 and/or 445 may be, or may include, an anti-reflective coating, adhesion promoter, aperture, and/or other layer of material dependent on application. As a non-limiting example, a thickness of the layers 430 and/or 445 may be approximately between 0.001 μm and 15 μm. In an aspect, as a non-limiting example, the shaped chalcogenide layer 435 may have thicknesses similar to the thicknesses $T_1$ and $T_2$ of the shaped chalcogenide layer 310, and/or the shaped chalcogenide layer 450 may have thicknesses similar to the $T_3$ and $T_4$ of the shaped chalcogenide layer 325. Although FIG. 4B shows the layers 430 and 445 provided as intervening layers between the substrate 405 and the shaped chalcogenide layers 435 and 450, respectively, one or both of the layers 430 and 445 may be optional dependent on application.

It is noted that FIGS. 4A and 4B provide implementations of the lens element 300 of FIG. 3A and the lens element 335 of FIG. 3C, respectively, in which an intervening layer is disposed between a substrate and a shaped chalcogenide layer. Similarly, in some embodiments, one or more intervening layers may be disposed on one or more surfaces of the substrate for any one of the lens elements 320, 360, and 375 of FIGS. 3B, 3D, and 3E, respectively. Further, although the lens elements 210A and 210B of FIG. 2B depicts lens elements having shapes similar to the lens element 335 of FIG. 3C and the lens element 425 of FIG. 4B, the lens elements 210A and/or 210B may be implemented using the lens elements 300, 320, 360, 375, and 400 of FIGS. 3A, 3B, 3D, 3E, and 4A, respectively, or other variation.

FIGS. 5A through 5E illustrate examples of lens shapes in accordance with one or more embodiments of the disclosure. The lens shapes may be provided in terms of a radial aperture representing a distance from a vertex of a lens, a sag of the lens, and a local slope at a particular radial aperture of the lens. In FIGS. 5A through 5E, the radial aperture ranges from 0.1 mm to 20 mm and the sag ranges from 5 μm to 300 μm. Sizes of the lenses may vary over a few orders of magnitude. As one example, the radial aperture may range from −10 mm to 10 mm. As another example, the radial aperture may range from −0.1 mm to 0.1 mm. As an example, a chalcogenide lens element may have a length approximately between 0.5 mm and 15 mm, a width approximately between 0.5 mm and 15 mm, and a thickness approximately between 0.3 mm and 3.5 mm.

Figure 6:
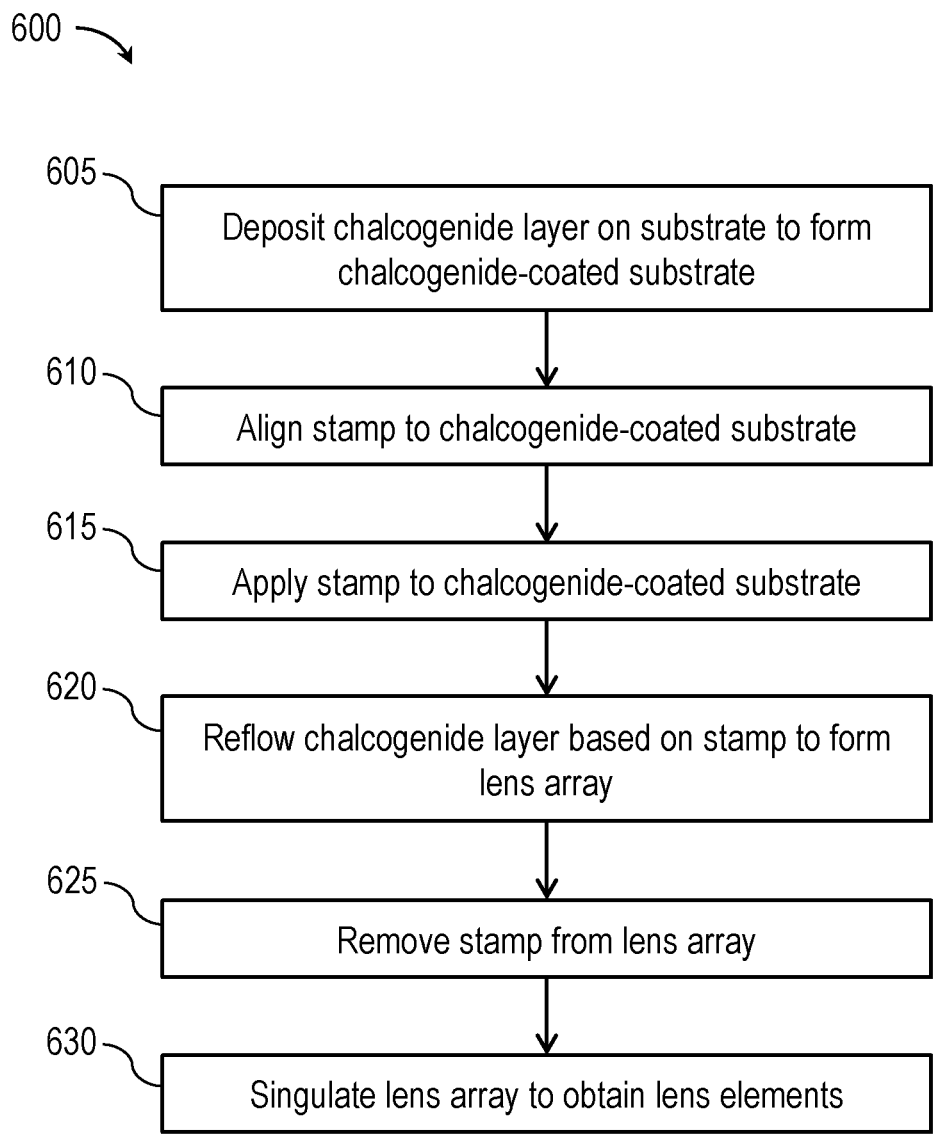
FIG. 6 illustrates a flow diagram of an example process for manufacturing chalcogenide lens elements in accordance with one or more embodiments of the disclosure.

FIG. 6 illustrates a flow diagram of an example process 600 for manufacturing chalcogenide lens elements in accordance with one or more embodiments of the disclosure. For explanatory purposes, the example process 600 is primarily described herein with reference to FIGS. 7A through 7G. However, the example process 600 is not limited to the structures shown in FIGS. 7A through 7G. FIGS. 7A through 7G illustrate cross-sectional views of multiple chalcogenide lens elements being formed on a substrate material, in accordance with one or more embodiments.

At block 605, a chalcogenide layer 710 is deposited on a surface of a substrate 705 to form a chalcogenide-coated substrate 715, as shown in FIG. 7A. For example, the chalcogenide layer 710 may be deposited by spinning, bonding, laminating, and/or evaporating chalcogenide material onto the substrate 705. For example, spinning the chalcogenide material onto the substrate 705 may be performed by putting chalcogenide material in a liquid carrier/material, depositing the liquid carrier (with the chalcogenide material) onto the substrate 705, spinning the liquid carrier (with the chalcogenide material) to form a uniform layer on the substrate 705, and curing to remove the liquid carrier and leave just the chalcogenide material on the substrate 705. In some aspects, the substrate 705 may be a silicon wafer or a germanium wafer. In some cases, the chalcogenide layer 710 may be a chalcogenide thin film having a thickness (denoted as $T_7$ in FIG. 7A) approximately between 0.001 mm and 0.350 mm, and the substrate 705 may have a thickness (denoted as $T_6$ in FIG. 7A) approximately between 0.3 mm and 3.0 mm. In some aspects, one or more layers of material may be deposited on the surface of the substrate 705 and then block 605 performed to deposit the chalcogenide layer 710 on a topmost layer of material, such that these layer(s) intervene between the substrate 705 and the chalcogenide layer 710. By way of a non-limiting example, the intervening layer(s) deposited on the substrate 705 may be or may include an anti-reflective coating, adhesion promoter, aperture, and/or other material dependent on application.

At block 610, a stamp 720 is aligned to the chalcogenide-coated substrate 715, as shown in FIG. 7B. The stamp 720 may be made of any variety of materials having durability for multiple uses and capable of providing (e.g., defining, imprinting) structural detail on the chalcogenide layer 710 to achieve one or more lens elements of one or more desired shapes. In one example, the stamp 720 may be made of a material having elasticity and sufficient mechanical strength, such as PDMS, PTFE, or other material. In another example, the stamp 720 may be made of a rigid material, such as a metal alloy (e.g., nickel alloy), silicon, ceramic, or other material.

Figure 7C:
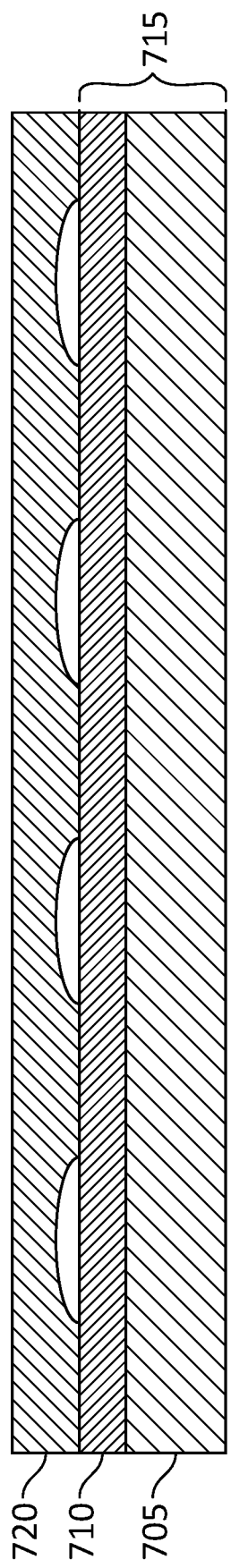
Figure 7D:
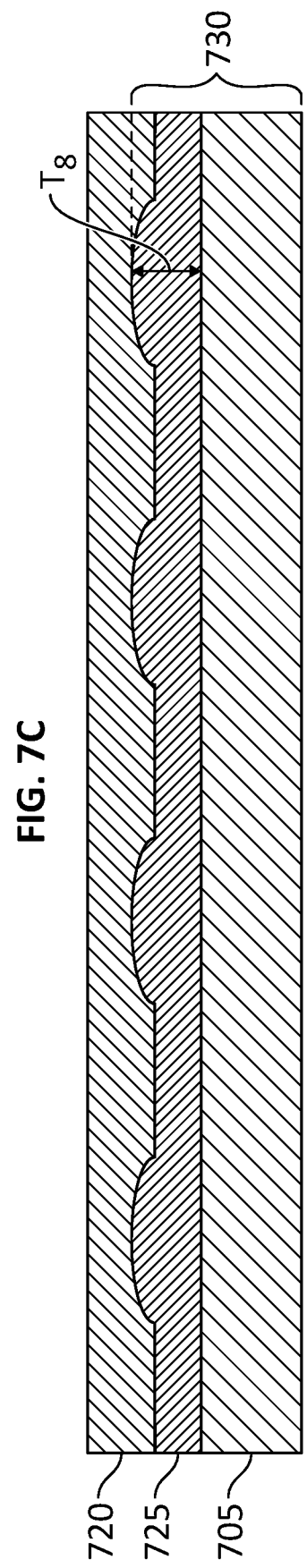

At block 615, the stamp 720 is applied to the chalcogenide-coated substrate 715, as shown in FIG. 7C. The stamp 720 may be placed in contact with the chalcogenide layer 710. Heat and/or pressure may be applied to the chalcogenide layer 710. At block 620, as shown in FIG. 7D, the chalcogenide layer 710 reflows, in response to applying the stamp 720, to a shape defined by the stamp 720 to form a shaped chalcogenide layer 725. The reflow may be in response to heat and/or pressure applied to the chalcogenide layer 710. The substrate 705 and the shaped chalcogenide layer 725 collectively provide a lens array 730. In some cases, a thickness of a thickest portion of the shaped chalcogenide layer 725 (denoted as $T_8$ in FIG. 7D) may be approximately between 0.002 mm and 0.40 mm. As an example, the heat utilized to cause reflow of the chalcogenide layer 710 may be between 150° C. and 300° C. Amount of heat and/or pressure applied, and duration of time over which such heat and/or pressure are applied, are generally dependent on material properties of the chalcogenide layer 710 (e.g., type of chalcogenide material) deposited on the substrate 705 at block 605. In some cases, thermal nanoimprint or hot embossing equipment may be used to perform block 615.

Figure 7E:
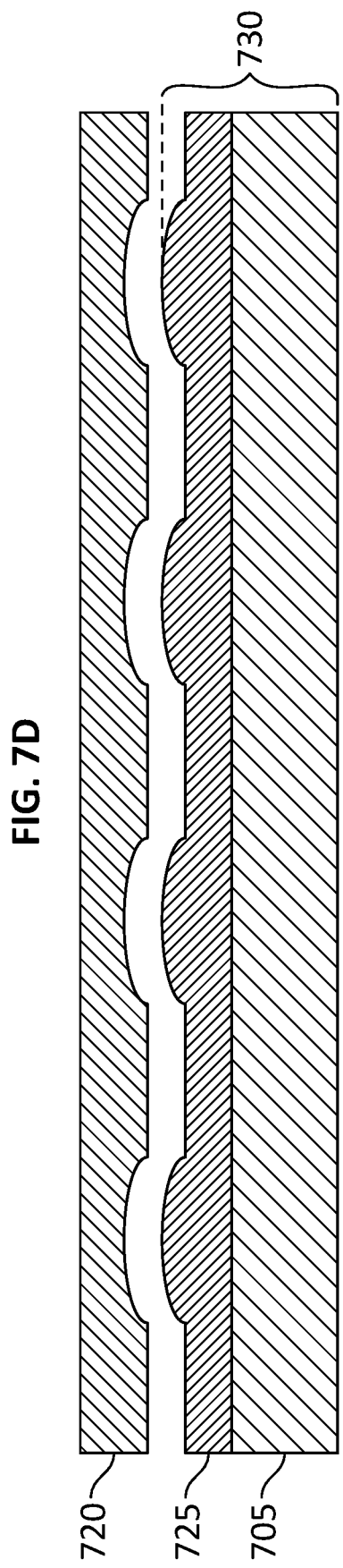
Figure 7F:
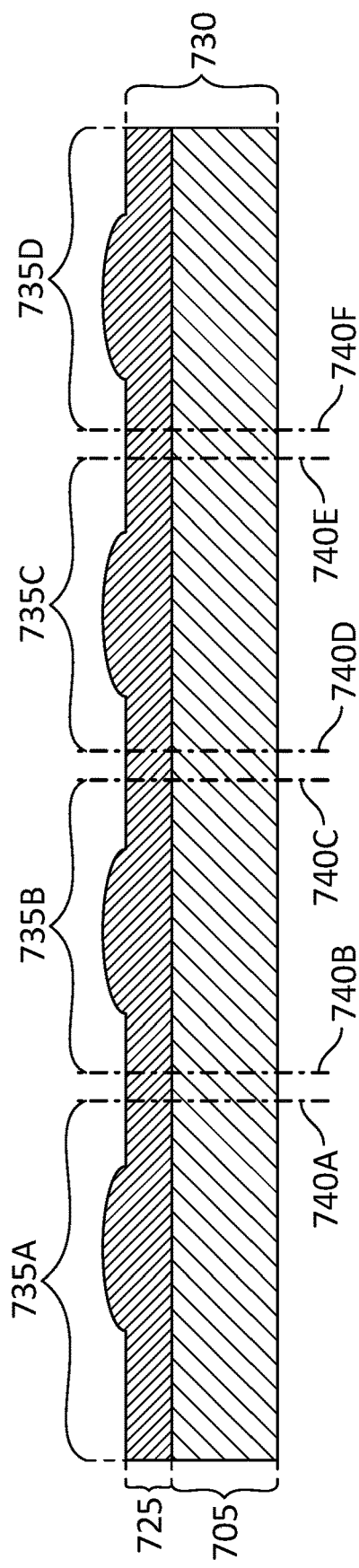
Figure 7G:
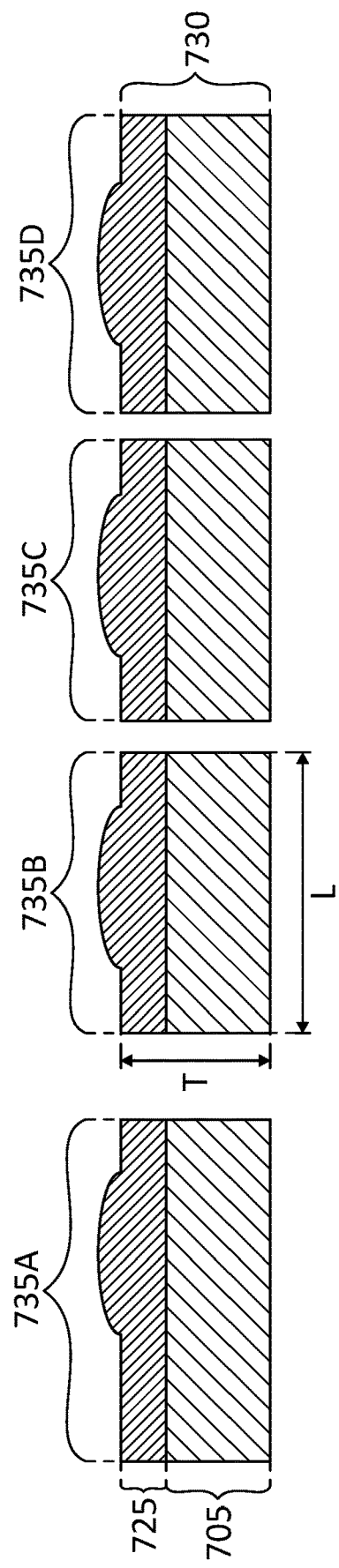

At block 625, the stamp 720 is removed from the lens array 730, as shown in FIGS. 7E and 7F. In this regard, upon removal, the stamp 720 is no longer in contact with the shaped chalcogenide layer 725. The stamp 720 may be demolded using techniques such as cooling (e.g., rapid cooling) and/or by applying release agents. At block 630, as shown in FIG. 7G, the lens array 730 is singulated (e.g., also referred to as diced) to obtain individual lens elements 735A-D. The lens array 730 may be singulated along planes depicted as dotted lines 740A-F in FIG. 7F. The singulation may provide more individual lens elements than those shown in FIG. 7G, such as from portions of the substrate 705 and shaped chalcogenide layer 725 not shown in FIGS. 7A through 7G. In some aspects, prior, subsequent, or alternative to singulation, wafer-level post-processing, such as annealing, anti-reflective coating and/or forming a lens on another surface of the substrate 705, may be performed after the shape of the stamp 720 is imprinted into the chalcogenide layer 710 to form the shaped chalcogenide layer 725. For example, an anti-reflective coating may be disposed on the shaped chalcogenide layer 725. The anti-reflective coating may be disposed on an exterior surface of the shaped chalcogenide layer 725 (e.g., a surface of the shaped chalcogenide layer 725 that faces a scene). A length L and a thickness T of the lens element 735B are labeled in FIG. 7G. A width W of the lens element 735B (not labeled) is orthogonal to the length L and the thickness T of the lens element 735B. As a non-limiting example, the lens element 735B has a length L approximately between 0.5 mm and 15 mm, a width W approximately between 0.5 mm and 15 mm, and a thickness T approximately between 0.3 mm and 3.5 mm.

In an aspect, one or more alignment marks may be utilized to facilitate alignment of the stamp 720 at block 610. In some cases, the alignment mark(s) may be applied on the substrate 705 prior to applying the chalcogenide layer 710 on the substrate 705 at block 605. The stamp 720 may have a corresponding alignment mark(s). The alignment mark(s) may be utilized for subsequent application of metal apertures or patterned anti-reflective (AR) coating. The alignment mark(s) may typically be positioned (e.g., defined) towards an edge of the wafer on which the lens array 730 is formed, although the alignment mark(s) may be defined at other location(s) of the wafer. In some cases, the location(s) of the alignment mark(s) may be based at least in part on aligner equipment utilized to facilitate alignment. If further layer processing is not needed, an outer edge (or other predetermined location) of the wafer may be utilized to align the stamp 720 to the chalcogenide-coated substrate 715 (e.g., with or without using alignment mark(s)).

In some embodiments, the shape of a stamp (e.g., 720) may be provided such that lens elements of the same nominal size and same nominal shape are defined when a chalcogenide layer (e.g., 710) is imprinted by the stamp. In these embodiments, after singulation, the lens elements (e.g., 735A-D) may nominally have the same size and shape. In other embodiments, the shape of the stamp may be provided such that lens elements of different sizes and/or different shapes are defined when a chalcogenide layer is imprinted by the stamp. In these embodiments, after singulation, the lens elements may be of different sizes and/or shapes.

Figure 8:
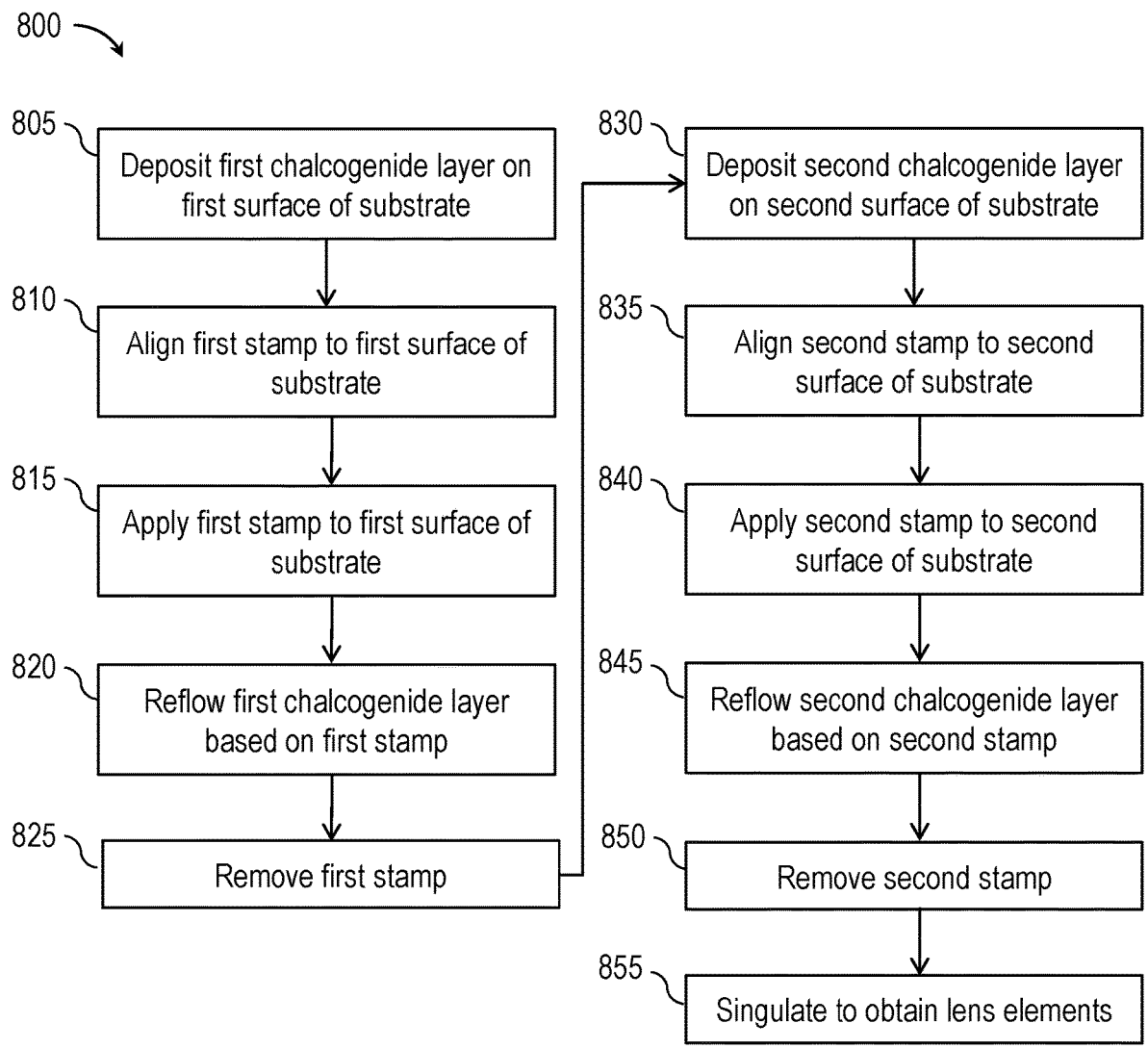
FIG. 8 illustrates a flow diagram of an example process for manufacturing chalcogenide lens elements in accordance with one or more embodiments of the disclosure.

FIG. 8 illustrates a flow diagram of an example process 800 for manufacturing chalcogenide lens elements in accordance with one or more embodiments of the disclosure. For explanatory purposes, the example process 800 is primarily described herein with reference to FIGS. 9A through 9G. However, the example process 800 is not limited to the structures shown in FIGS. 9A through 9G. FIGS. 9A through 9G illustrate side views of multiple chalcogenide lens elements being formed on a substrate material, in accordance with one or more embodiments. The description of FIGS. 6 and 7A through 7G generally applies to FIGS. 8 and 9A through 9G, with examples of differences and other description provided herein.

Figure 9A:
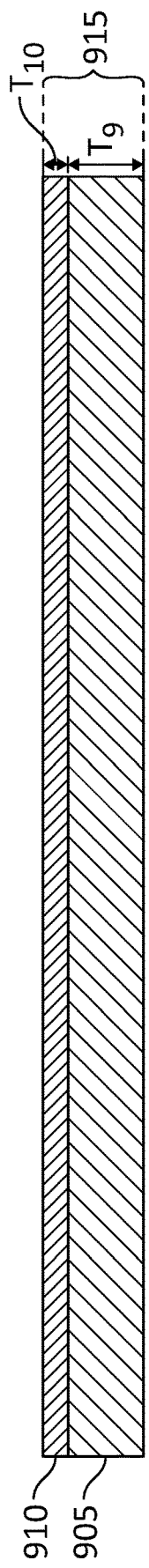
FIGS. 9A through 9G illustrate cross-sectional views of multiple chalcogenide lens elements being formed on a substrate material, in accordance with one or more embodiments.

At block 805, a chalcogenide layer 910 is deposited on a first surface of a substrate 905 to form a chalcogenide-coated substrate 915, as shown in FIG. 9A. By way of a non-limiting example, the chalcogenide layer 910 may be deposited by spinning, bonding, laminating, and/or evaporating chalcogenide material onto the substrate 905. In some cases, the chalcogenide layer 910 be a chalcogenide thin film having a thickness (denoted as $T_{10}$ in FIG. 9A) approximately between 0.001 mm and 0.350 mm, and the substrate 905 may have a thickness (denoted as $T_9$ in FIG. 9A) approximately between 0.3 mm and 3.0 mm. In some aspects, one or more layers of material may be deposited on the first surface of the substrate 905 and then block 805 performed to deposit the chalcogenide layer 910 on a topmost layer of material, such that these layer(s) intervene between the substrate 905 and the chalcogenide layer 910. By way of a non-limiting example, the intervening layer(s) deposited on the first surface of the substrate 905 may be or may include an anti-reflective coating, adhesion promoter, aperture, and/or other material dependent on application.

Figure 9B:
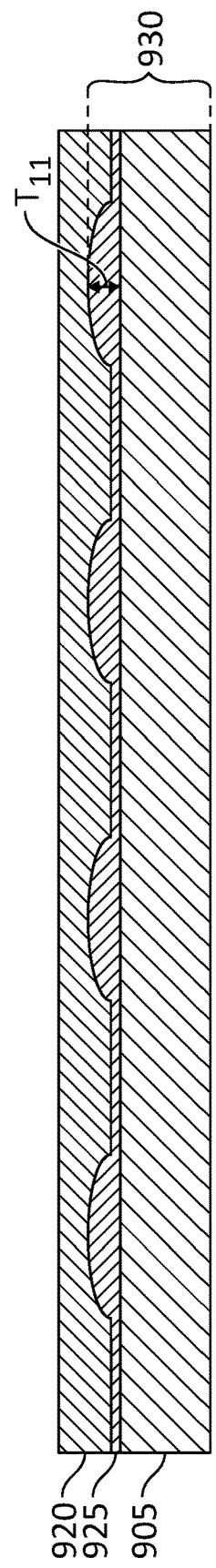
Figure 9C:
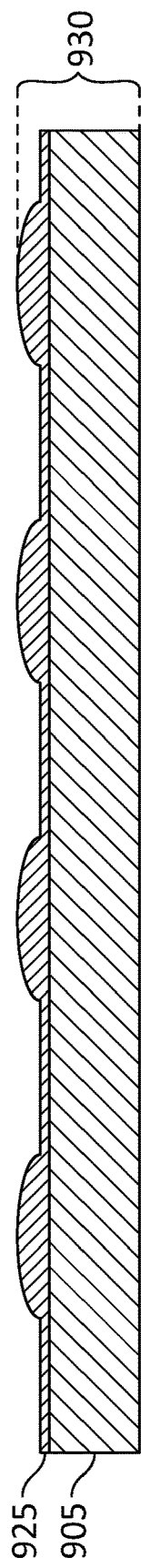

At block 810, a stamp 920 is aligned to the chalcogenide-coated substrate 915. At block 815, the stamp 920 is applied to the chalcogenide-coated substrate 915. For example, heat and/or pressure may be applied to the chalcogenide layer 910 while the stamp 920 is in contact with the chalcogenide layer 910 (e.g., in contact with a surface of the chalcogenide layer 910). At block 820, the chalcogenide layer 910 reflows to a shape defined by the stamp 920 in response to applying the stamp 920 to form a shaped chalcogenide layer 925, as shown in FIG. 9B. In some cases, a thickness of a thickest portion of the shaped chalcogenide layer 925 (denoted as $T_{11}$ in FIG. 9B) may be approximately between 0.002 mm and 0.40 mm. In FIG. 9B, the substrate 905 and the shaped chalcogenide layer 925 collectively provide a first side lens array 930. In other cases, the first side lens array 930 may refer only to the shaped chalcogenide layer 925 (e.g., the first side lens array 930 excludes the substrate 905). At block 825, the stamp 920 is removed.

Figure 9D:
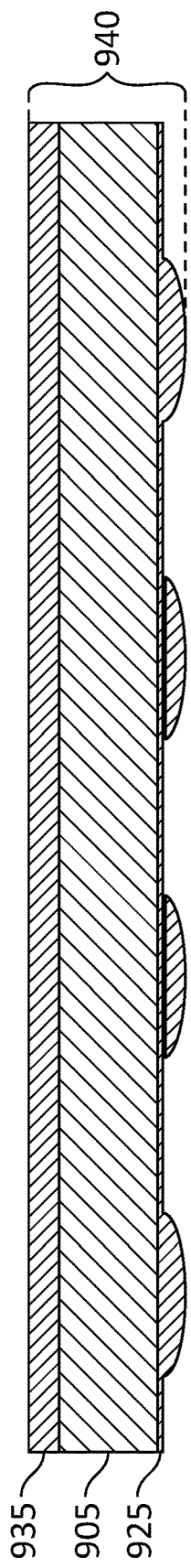

At block 830, a chalcogenide layer 935 is deposited on a second surface of the substrate 905 to form a chalcogenide-coated substrate 940, as shown in FIG. 9D. By way of a non-limiting example, the chalcogenide layer 935 may be deposited by spinning, bonding, laminating, and/or evaporating chalcogenide material onto the second surface of the substrate 905. In some cases, a deposition system utilized to deposit the chalcogenide layer 935 may remain in place while the substrate 905 (e.g., with the shaped chalcogenide layer 925 formed thereon) is flipped, such that the chalcogenide layer 935 is deposited on the second surface of the substrate 905. In some aspects, one or more layers of material may be deposited on the second surface of the substrate 905 and then block 830 performed to deposit the chalcogenide layer 935 on a topmost layer of material (e.g., the layer farthest from the second surface of the substrate 905), such that these layer(s) intervene between the substrate 905 and the chalcogenide layer 935. By way of a non-limiting example, the intervening layer(s) deposited on the second surface of the substrate 905 may be or may include an anti-reflective coating, adhesion promoter, aperture, and/or other material dependent on application.

Figure 9E:
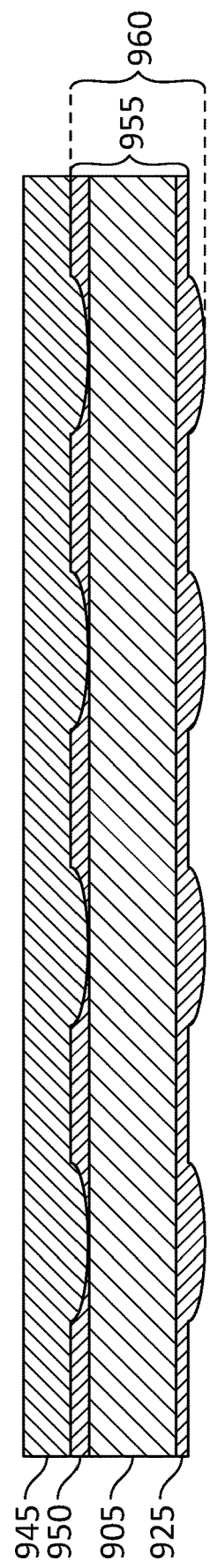
Figure 9F:
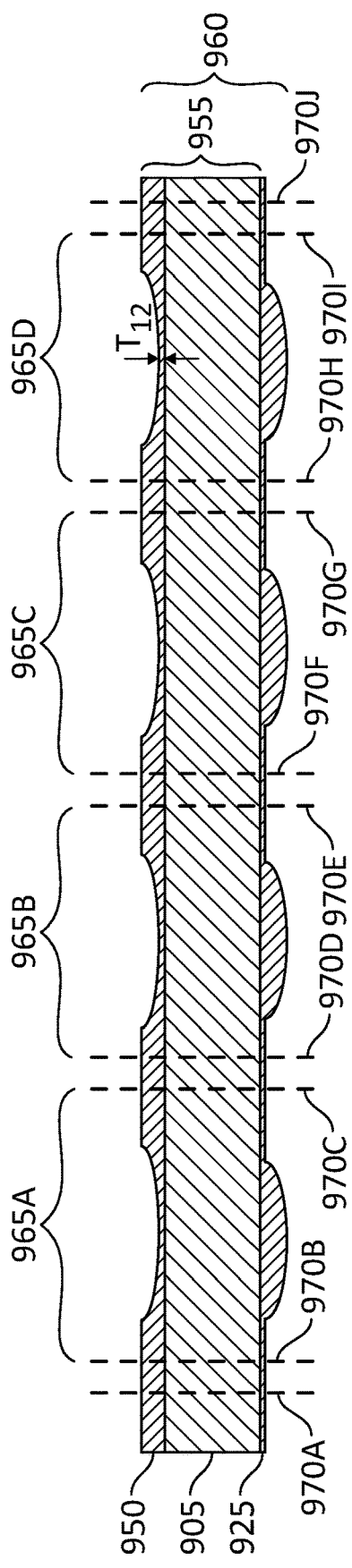

At block 835, a stamp 945 is aligned to the chalcogenide-coated substrate 940. At block 840, the stamp 945 is applied to the chalcogenide layer 935. For example, heat and/or pressure may be applied to the chalcogenide layer 935 while the stamp 945 is in contact with the chalcogenide layer 935 (e.g., in contact with a surface of the chalcogenide layer 935). At block 845, the chalcogenide layer 935 reflows to a shape defined by the stamp 945 in response to applying the stamp 945 to form a shaped chalcogenide layer 950, as shown in FIGS. 9E and 9F. At block 850, the stamp 945 is removed. In some cases, a thickness of a thinnest portion of the shaped chalcogenide layer 950 (denoted as $T_{12}$ in FIG. 9F) may be approximately between 0.0005 mm and 0.30 mm.

In FIG. 9E, the substrate 905 and the shaped chalcogenide layer 925 collectively provide a second side lens array 955. In other cases, the second side lens array 955 may refer only to the shaped chalcogenide layer 950 (e.g., the second side lens array 955 excludes the substrate 905). The substrate 905 and the shaped chalcogenide layers 925 and 950 collectively provide a lens array 960. In FIG. 9E, the stamp 945 is different from the stamp 920. In other cases, such as in cases that the lens elements are symmetric (e.g., the lens elements 360 and 375 of FIGS. 3D and 3E), the stamp 920 utilized to form the first side lens array 930 may also be used to form the second side lens array 955.

Figure 9G:
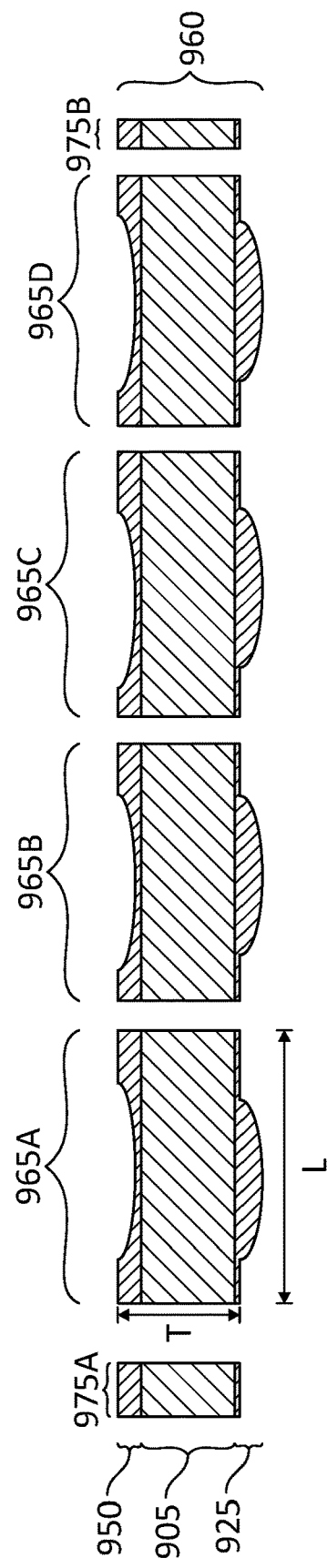

At block 855, as shown in FIG. 9G, the lens array 960 is singulated to obtain individual lens elements 965A-D. The singulation may provide additional individual lens elements, such as from portions of the substrate 905 and shaped chalcogenide layers 925 and 950 not shown or only partially shown in FIGS. 9A through 9G. For example, FIG. 9G shows portions 975A and 975B, which may be portions of individual lens elements. The lens array 960 may be singulated along planes depicted as dotted lines 970A-J in FIG. 9F. In some aspects, prior, subsequent, or alternative to singulation, wafer-level post-processing such as anti-reflective coating may be performed after the shape of the stamps 920 and/or 945 are imprinted into the chalcogenide layer 910 and/or 935, respectively, to form the shaped chalcogenide layers 925 and 950. For example, an anti-reflective coating may be disposed on the shaped chalcogenide layer 925 and/or 950 (e.g., an exterior surface of one or both of the shaped chalcogenide layers 925 or 950).

A length L and a thickness T of the lens element 965A are labeled in FIG. 9G. A width W of the lens element 965A (not labeled) is orthogonal to the length L and the thickness T of the lens element 965A. As a non-limiting example, the lens element 965A has a length L approximately between 0.5 mm and 15 mm, a width W approximately between 0.5 mm and 15 mm, and a thickness T approximately between 0.3 mm and 3.5 mm.

As shown in FIGS. 8 and 9A-9G, blocks 805, 810, 815, 820, and 825 may be performed to obtain a first lens portion (e.g., also referred to as a first side lens) of the lens elements 965A-D, and blocks 830, 835, 840, 845, and 850 may be performed to obtain a second lens portion (e.g., also referred to as a second side lens) of the lens elements 965A-D. In some cases, since a second lens portion is formed, one or more alignment marks may need to be created prior to performing block 815 (e.g., prior to applying the stamp 920 to the chalcogenide layer 910). Each of the alignment mark(s) may be utilized to facilitate alignment of the stamp 920 at block 815 and/or the stamp 945 at block 835. In some cases, the alignment mark(s) may be applied on the substrate 905 prior to applying the chalcogenide layer 910 on the substrate 905 at block 805. The stamps 920 and/or 945 may have a corresponding alignment mark(s). The alignment mark(s) may typically be defined towards an edge of the wafer on which the lens array 960 is formed, although the alignment mark(s) may be defined at other location(s) of the wafer. In some cases, the location(s) of the alignment mark(s) may be based at least in part on aligner equipment utilized to facilitate alignment.

In some embodiments, the shape of the stamps (e.g., 920, 945) may be provided such that lens elements of the same nominal size and same nominal shape are defined when each chalcogenide layer (e.g., 910, 935) is imprinted by its respective stamp. In these embodiments, after singulation, the lens elements (e.g., 965A-D) may nominally have the same size and shape. For example, any one of the lens elements 965A-D may be utilized as the lens element 210A of FIG. 2B. In this example, the lens element 210B of FIG. 2B may be manufactured by using a different combination of stamps that have appropriate shapes to allow manufacture of the lens element 210B.

In other embodiments, the shape of the stamps may be provided such that lens elements of different sizes and/or different shapes are defined when each chalcogenide layer is imprinted by its respective stamp. In these embodiments, after singulation, the lens elements may be of different sizes and/or shapes. In one example, both of the lens elements 210A and 210B of FIG. 2B may be manufactured by performing one iteration of the example process 900 using an appropriate combination of stamps.

Although FIGS. 8 and 9A-9G provide an example manufacturing process in which one shaped chalcogenide layer (e.g., 925, 950) is formed at a time, in some embodiments, both shaped chalcogenide layers may be formed substantially simultaneously. For example, the substrate 905 may have the chalcogenide layer 910 on a first surface of the substrate 905 and the chalcogenide layer 935 on a second surface of the substrate 905, where the first surface is opposite the first surface. The stamps 920 and 945 may then be applied such that the shaped chalcogenide layers 925 and 950 may be formed together. It is noted that other wafer-level operations and die-level operations can be performed on the substrate 705 or the substrate 905 (not shown in FIGS. 6, 7A-7G, 8, and 9A-9G), such as anti-reflective coating, photolithography, metal evaporation, and/or other operations.

It is noted that dimensional aspects provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect. Similarly, aspects related to distances between features also have associated tolerances.

Terms such as "top", "bottom", "front", "rear", "side", "horizontal", "vertical", and the like refer to an arbitrary frame of reference, rather than to the ordinary gravitational frame of reference. Thus, such a term may extend upwardly, downwardly, diagonally, or horizontally in a gravitational frame of reference.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method, comprising:
    depositing a first chalcogenide layer on a substrate;
    applying a first stamp to the first chalcogenide layer; and
    reflowing, in response to applying the first stamp, the first chalcogenide layer to form a first shaped chalcogenide layer;
    singulating the substrate and the first shaped chalcogenide layer to obtain a plurality of chalcogenide lens elements, wherein at least one of the plurality of chalcogenide lens elements has a length approximately between 0.5 mm and 15 mm, a width approximately between 0.5 mm and 15 mm, and a thickness approximately between 0.3 mm and 3.5 mm.

2. The method of claim 1, further comprising disposing an anti-reflective coating on the first shaped chalcogenide layer, wherein at least one of the plurality of chalcogenide lens elements is an aspheric chalcogenide lens element.

3. The method of claim 1, further comprising aligning the first stamp to the first chalcogenide layer, wherein the applying is based on the aligning.

4. The method of claim 1, wherein the first chalcogenide layer is deposited on the substrate such that the first chalcogenide layer is in direct contact with the substrate, and wherein the first stamp is formed of polydimenthylsiloxane or polytetrafluoroethylene.

5. The method of claim 1, further comprising depositing a supplementary layer on the substrate, wherein the supplementary layer is in direct contact with the substrate, and wherein the first chalcogenide layer is deposited on the substrate such that the first chalcogenide layer is in direct contact with the supplementary layer.

6. The method of claim 1, wherein the applying the first stamp comprises:
    positioning the first stamp in contact with the first chalcogenide layer; and
    applying heat and/or pressure to the first chalcogenide layer,
    wherein the reflowing is in response to the applying the heat and/or the pressure.

7. The method of claim 1, wherein the first chalcogenide layer is deposited on a first surface of the substrate, the method further comprising:
    depositing a second chalcogenide layer on a second surface of the substrate;
    applying a second stamp to the second chalcogenide layer; and
    reflowing, in response to applying the second stamp, the second chalcogenide layer to form a second shaped chalcogenide layer,
    wherein the singulating comprises singulating the substrate, the first shaped chalcogenide layer, and the second shaped chalcogenide layer to obtain the plurality of chalcogenide lens elements, wherein each of the plurality of chalcogenide lens elements comprises a respective portion of the substrate, a respective portion of the first shaped chalcogenide layer, and a respective portion of the second shaped chalcogenide layer.

8. The method of claim 7, wherein each of the plurality of chalcogenide lens elements has a first curved portion extending away from the substrate in a convex manner and a second curved portion extending toward the substrate in a concave manner.

9. A chalcogenide lens element made according to the method of claim 7, wherein the chalcogenide lens element comprises:
    a portion of the substrate;
    a portion of the first shaped chalcogenide layer, wherein the portion of the first shaped chalcogenide layer is on the first surface of the portion of the substrate; and
    a portion of the second shaped chalcogenide layer, wherein the portion of the second shaped chalcogenide layer is on the second surface of the portion of the substrate.

10. An infrared imaging device comprising the chalcogenide lens element of claim 9, the infrared imaging device further comprising:
    a housing;
    a lens barrel comprising the chalcogenide lens element, wherein the lens barrel is coupled to the housing;
    an image capture component within the housing and configured to receive electromagnetic radiation passed through the chalcogenide lens element and generate image data based on the received electromagnetic radiation; and
    an image capture interface component within the housing and configured to receive the image data from the image capture component and communicate the image data, wherein the electromagnetic radiation comprises thermal radiation, and wherein the image data comprises thermal image data.

11. An infrared imaging device comprising a chalcogenide lens element made according to the method of claim 1, the infrared imaging device further comprising:
   a housing;
   a lens barrel comprising the chalcogenide lens element, wherein the lens barrel is coupled to the housing; and
   an image capture component within the housing and configured to receive electromagnetic radiation passed through the chalcogenide lens element and generate image data based on the received electromagnetic radiation,
   wherein the chalcogenide lens element comprises a portion of the substrate and a portion of the first shaped chalcogenide layer.

12. The method of claim 1, further comprising assembling an infrared imaging device comprising at least one of the plurality of chalcogenide lens elements, a lens barrel, and an image capture component, wherein the assembling comprises:
   inserting the at least one of the plurality of chalcogenide lens elements into the lens barrel; and
   positioning the image capture component to receive electromagnetic radiation passed through the at least one of the plurality of chalcogenide lens elements.

13. A chalcogenide lens element, comprising:
   a substrate comprising a first portion of a wafer-level lens array; and
   a first chalcogenide layer comprising a second portion of the wafer-level lens array,
   wherein the first chalcogenide layer is on the substrate, wherein the chalcogenide lens element has a length approximately between 0.5 mm and 15 mm, a width approximately between 0.5 mm and 15 mm, and a thickness approximately between 0.3 mm and 3.5 mm.

14. The chalcogenide lens element of claim 13, further comprising:
   an anti-reflective coating disposed on the first chalcogenide layer; and
   a supplementary layer between the substrate and the first chalcogenide layer, wherein the supplementary layer comprises an anti-reflective coating, an adhesion promoter, and/or an aperture, and wherein the first chalcogenide layer has an aspheric shape.

15. The chalcogenide lens element of claim 13, further comprising:
   a second chalcogenide layer comprising a third portion of the wafer-level lens array, wherein the second chalcogenide layer is on the substrate, wherein the first chalcogenide layer has a curved portion extending away from the substrate in a convex manner, and wherein the second chalcogenide layer has a curved portion extending toward the substrate in a concave manner, and the chalcogenide lens element further comprising an anti-reflective coating disposed on the first chalcogenide layer and/or the second chalcogenide layer, wherein a thickest portion of the curved portion of the first chalcogenide layer has a thickness approximately between 0.002 mm and 0.40 mm, and wherein a thinnest portion of the curved portion of the second chalcogenide layer has a thickness approximately between 0.0005 mm and 0.30 mm.

16. An infrared imaging device comprising the chalcogenide lens element of claim 15, the infrared imaging device further comprising:
   a housing;
   a lens barrel comprising the chalcogenide lens element, wherein the lens barrel is coupled to the housing; and
   an image capture component within the housing and configured to receive electromagnetic radiation passed through the chalcogenide lens element and generate image data based on the received electromagnetic radiation.

17. The infrared imaging device of claim 16, further comprising an image capture interface component within the housing and configured to receive the image data from the image capture component and communicate the image data, wherein the electromagnetic radiation comprises thermal radiation, and wherein the image data comprises thermal image data.

18. A method of assembling the infrared imaging device of claim 17, the method comprising:
   inserting the chalcogenide lens element into the lens barrel;
   positioning the image capture component to receive electromagnetic radiation passed through the chalcogenide lens element; and
   coupling the image capture component to the image capture interface component.

19. An infrared imaging device comprising the chalcogenide lens element of claim 13, the infrared imaging device further comprising:
   a housing;
   a lens barrel comprising the chalcogenide lens element, wherein the lens barrel is coupled to the housing; and
   an image capture component within the housing and configured to receive electromagnetic radiation passed through the chalcogenide lens element and generate image data based on the received electromagnetic radiation.

20. The chalcogenide lens element of claim 13, wherein the substrate has a thickness approximately between 0.3 mm and 3.0 mm.

* * * * *